Patented July 31, 1928.

1,679,214

UNITED STATES PATENT OFFICE.

WESLEY REIFF GERGES, OF PHILADELPHIA, PENNSYLVANIA, ASSIGNOR TO THE BARRETT COMPANY, A CORPORATION OF NEW JERSEY.

PROCESS FOR PRODUCING RESIN BY POLYMERIZATION.

No Drawing.   Application filed November 6, 1924.   Serial No. 748,121.

This invention relates to the production of so-called paracoumaron resin by polymerizing the polymerizable constituents such as cumaron and indene, for example, that are contained in solvents or oils such as solvent naphtha, for example. It relates more particularly to a process of producing resin of this character in which the polymerization can be caused to cease at any time at the option of the operator and the amount of naphtha, solvent or oil wasted will be minimized.

Heretofore in polymerizing naphthas to produce resins, the naphthas have been treated with sulfuric acid to polymerize the polymerizable constituents during which time a thick, viscous acid sludge is formed and settles to the bottom of the container after completion of polymerization. This thick, viscous mass settles very slowly and it consequently requires a considerable length of time for the mass to settle sufficiently to be drawn off from the remainder of the naphtha or oil and even then its separation is less complete and perfect than is desired. Besides, the acid sludge either dissolves or mechanically entrains therewith a considerable percentage of the naphtha or oil which is consequently lost when the sludge is drawn off and thrown away.

By the present invention the usual practice may be followed so far as the introduction of sulfuric acid or other polymerizing agent into the solvent naphtha or oil is concerned, but instead of waiting a long time for the sludge to settle to the bottom of the vessel after it is formed, the sulfuric acid or other polymerizing agent such as aluminium chloride, for example is introduced into the naphtha or oil while the same is being agitated and as soon as the polymerization has progressed to the desired extent, the freshly polymerized oil is immediately run into cold water or a sufficient amount of water is introduced to dilute the polymerizing agent to such an extent that the polymerization will be caused to cease immediately and due to the dilution of the sludge with water, the naphtha or oil that would otherwise be dissolved or mechanically held therein will rise while the sludge itself will promptly settle to the bottom very completely in a short time. In this way a more complete separation of the tar is effected than would be the case without dilution. The sludge dissolved in water may then be drawn off from the bottom leaving the oil polymerized to the desired extent. Instead of using water for dilution purposes other diluents may be used to cause the polymerization to cease at the desired point. For example, when using sulfuric acid as the polymerizing agent the dilution may be effected with a very weak solution of sulfuric acid or with a weak solution of sodium sulfate, and when using aluminium chloride as the polymerizing agent the dilution may be effected with a weak solution of hydrochloric acid or with a weak solution of sodium chloride. The dilution of the polymerized oil may also be effected with other oils that do not contain constituents that would be polymerized when the latter oils are used as the diluent, thus facilitating the separation of the sludge from the mixture, although instantaneous cessation of polymerization would not be thereby brought about.

The polymerization products are soluble in the naphtha or oil and by simply washing with water and distilling off the solvent after neutralization with an alkali the polymerization product or resin is left as a residue in the still. The following specific example is given to illustrate a particular manner in which the invention may be carried out. It is to be understood, however, that the invention is not restricted to the particular example given as it is applicable to different polymerization processes in which polymerizing agents of different sorts and strengths, such as sulfuric acid, aluminium chloride, etc., are used to polymerize different sorts of naphthas which contain polymerizable constituents. Also, different sorts of diluents are suitable for stopping the polymerization when desired.

Solvents or oils containing polymerizable constituents such as cumaron and indene, for example, are treated with about 2 volume per cent to about 5 volume per cent of 66° Bé. sulfuric acid, while stirring and restricting the temperature to approximately 0° C.

and without permitting it to rise above approximately about 15° C., to effect the polymerization of said constitutents which will usually take about 10 minutes. The freshly polymerized solvent or oil is then diluted with about three volume per cent to 10 times more or less of its volume of cold water. Settling is then permitted to take place which it does very promptly or in about 10 to 15 minutes and the water solution of sludge is drawn off from the bottom of the vessel. The bottom of the vessel may, if desired, be made of conical shape so as to facilitate this, or a centrifuge may be used to effect the separation of the solution of sludge in water from the oil. The remaining oil may then be transferred to another vessel and then neutralized with a solution of 1.20 specific gravity sodium hydroxide, washed with water several times, if necessary, and then distilled to recover as a residue the resin or polymerized products that are held in solution.

By diluting the freshly polymerized oil with a suitable diluent such as water, for example at the proper moment as above described, lighter colored resins are produced than could heretofore be done when following the process described except for the dilution step because the retention of the polymerized oil in an acid condition for a long time causes the darkening of the already polymerized light colored resins and other constituents inseparable therefrom; the necessity of permitting the oil to stand for a long time in order for tarry viscous sludge to settle is rendered unnecessary; the practically instantaneous cessation of polymerization at the desired moment can be effected; the loss of a considerable amount of oil by being dissolved in the sludge and thereby carried away does not take place and the relatively complete separation of the polymerizing agent from the oil upon settling saves a considerable amount of alkali or sodium hydroxide that would otherwise be required for neutralizing.

I claim:

1. The process which comprises polymerizing solvents containing polymerizable constituents of the coumarone and indene classes and before all the polymerizable constituents have been polyerized diluting the mixture with a sufficient amount of a non-neutralizing diluent for the polymerizing agent to arrest polymerization.

2. The process which comprises polymerizing solvents containing polymerizable constituents of the coumarone and indene classes and diluting the mixture with a sufficient amount of a non-neutralizing diluent for the polymerizing agent to arrest polymerization as soon as polymerization has progressed to the desired degree.

3. The process which comprises polymerizing solvents containing polymerizable constituents of the coumarone and indene classes and during the process of polymerization diluting the mixture with a sufficient amount of a non-neutralizing diluent for the polymerizing agent to cause the polymerizing action to cease.

4. The process which comprises treating solvent naphtha containing polymerizable constituents with a polymerizing agent and, before all the polymerizable constituents have been polymerized, diluting the mixture with a sufficient amount of a non-neutralizing diluent for the polymerizing agent to arrest polymerization.

5. The process which comprises treating solvents containing polymerizable constituents of the coumarone and indene classes with a polymerizing agent and, before all the polymerizable constituents have been polymerized, diluting the mixture with a sufficient amount of water to arrest polymerization.

6. The process which comprises treating solvents containing polymerizable constituents of the coumarone and indene classes with a polymerizing agent and, before all the polymerizable constituents have been polymerized, diluting the sludge so formed with a sufficient amount of non-neutralizing diluent to liberate the oil therein.

7. The process which comprises treating solvents containing polymerizable constituents of the coumarone and indene classes with a polymerizing agent and, before all the polymerizable constituents have been polymerized, diluting the sludge so formed with a sufficient amount of non-neutralizing diluent to liberate the oil therein and cause the sludge to settle rapidly.

8. The process which comprises treating solvent naphtha containing polymerizable constituents with a polymerizing agent and, before all the polymerizable constituents have been polymerized, diluting the mixture with a sufficient amount of water to arrest polymerization.

9. The process which comprises treating solvent naphtha containing polymerizable constituents with sulfuric acid and, before all the polymerizable constituents have been polymerized, introducing the mixture into a sufficient amount of water to arrest polymerization.

10. The process which comprises treating solvent naphtha containing polymerizable constituents with sulfuric acid and, before all the polymerizable constituents have been polymerized, diluting the mixture with a sufficient amount of water to arrest polymerization.

11. The process which comprises treating solvent naphtha containing polymerizable constituents with sulfuric acid and, before all the polymerizable constituents have been polymerized, diluting the mixture with water in amount between 3 and 1000 volume per cent.

12. The process which comprises treating solvents containing polymerizable constituents of the coumarone and indene classes with a polymerizing agent and, before the formation of any appreciable amount of dark resinous bodies, diluting the mixture with a sufficient amount of a non-neutralizing diluent for the polymerizing agent to arrest polymerization.

In testimony whereof I affix my signature.

WESLEY REIFF GERGES.

CERTIFICATE OF CORRECTION.

Patent No. 1,679,214.  Granted July 31, 1928, to

WESLEY REIFF GERGES.

It is hereby certified that error appears in the printed specification of the above numbered patent requiring correction as follows: Page 2, line 53, claim 1, for the misspelled word "polyerized" read "polymerized"; same page, line 68, claim 3, for the word "process" read "progress"; and that the said Letters Patent should be read with these corrections therein that the same may conform to the record of the case in the Patent Office.

Signed and sealed this 11th day of September, A. D. 1928.

(Seal)
M. J. Moore,
Acting Commissioner of Patents.

polymerized, diluting the mixture with water in amount between 3 and 1000 volume per cent.

12. The process which comprises treating solvents containing polymerizable constituents of the coumarone and indene classes with a polymerizing agent and, before the formation of any appreciable amount of dark resinous bodies, diluting the mixture with a sufficient amount of a non-neutralizing diluent for the polymerizing agent to arrest polymerization.

In testimony whereof I affix my signature.

WESLEY REIFF GERGES.

CERTIFICATE OF CORRECTION.

Patent No. 1,679,214.     Granted July 31, 1928, to

WESLEY REIFF GERGES.

It is hereby certified that error appears in the printed specification of the above numbered patent requiring correction as follows: Page 2, line 53, claim 1, for the misspelled word "polyerized" read "polymerized"; same page, line 68, claim 3, for the word "process" read "progress"; and that the said Letters Patent should be read with these corrections therein that the same may conform to the record of the case in the Patent Office.

Signed and sealed this 11th day of September, A. D. 1928.

(Seal)

M. J. Moore,
Acting Commissioner of Patents.